United States Patent
Shinagawa et al.

(10) Patent No.: US 9,482,543 B2
(45) Date of Patent: Nov. 1, 2016

(54) PATH SEARCHING METHOD AND PATH SEARCH DEVICE

(71) Applicant: FUJITSU LIMITED, Kawasaki-shi (JP)

(72) Inventors: Akio Shinagawa, Nakano (JP); Kyohei Tamai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/796,559

(22) Filed: Mar. 12, 2013

(65) Prior Publication Data

US 2013/0245940 A1    Sep. 19, 2013

(30) Foreign Application Priority Data

Mar. 15, 2012 (JP) ................. 2012-059452

(51) Int. Cl.
G01C 21/34 (2006.01)
G06N 5/00 (2006.01)

(52) U.S. Cl.
CPC ........... *G01C 21/3446* (2013.01); *G06N 5/003* (2013.01)

(58) Field of Classification Search
CPC ........................... G01C 21/3446; G01C 21/26
USPC .................................. 701/408–540
See application file for complete search history.

(56) References Cited

U.S. PATENT DOCUMENTS 5,938,720 A * 8/1999 Tamai ............ 701/533
2011/0251783 A1* 10/2011 Doi ............... 701/200

FOREIGN PATENT DOCUMENTS

| EP | 0575943 | 9/1997 |
|----|---------|--------|
| EP | 0833290 | 4/2002 |
| JP | 06-052237 | 2/1994 |
| JP | 2006-162273 | 6/2006 |
| WO | WO 2009-158058 | 12/2009 |

OTHER PUBLICATIONS

E. W. Dijkstra, "*A Note on Two Problems in Connexion with Graphs*," Numerische Mathematik 1 (Jun. 1959), pp. 269-271.

Hart et al., "*A Formal Basis for the Heuristic Determination of Minimum Cost Paths*," IEEE Transactions of Systems Science and Cybernetics, vol. SSC-4, No. 2 (Jul. 1968), pp. 100-107.

Kazuo Iwano; "*The Basics of Algorithms*," pp. 86-101 (Partial English translation will be provided).

Kazuo Iwano; "*The Basics of Algorithms*," Graph Algorithms: Minimum Spanning Tree and Shortest Path (partial English Translation).

(Continued)

*Primary Examiner* — Michael D Lang
(74) *Attorney, Agent, or Firm* — Fujitsu Patent Center

(57) ABSTRACT

A computer determines to which of a plurality of levels each of a plurality of road types for which a path search is performed corresponds, according to a distance between a departure point and a destination point. Next, the computer performs a first path search for the road type associated with a first level from the departure point to the destination point, and a second path search for the road type associated with the first level from the destination point to the departure point. Then, the computer performs a third path search for the road type associated with a second level according to a point obtained in the first path search and a point obtained in the second path search, and generates path information according to a result of the first path search, the second path search, and the third path search.

8 Claims, 23 Drawing Sheets

(56) References Cited

OTHER PUBLICATIONS

Juan-Antonio Fernández-Madrigal et al., "Multihierarchical Graph Search", IEEE Transactions on Pattern Analysis and Machined Intelligence, vol. 24, No. 1, Jan. 2002, pp. 103-113.

L. Fu et al., "Heuristic shortest path algorithms for transportation applications: State of the art", Computers and Operations Research 33 (2006), available online May 3, 2005, pp. 3324-3343.

H. Gonzalez et al., "Adaptive Fastest Path Computation on a Road Network: A Traffic Mining Approach", Dept. of Computer Science, University of Illinois at Urbana-Champaign, Sep. 23-28, 2007, pp. 794-805.

Extended European Search Report mailed by EPO and corresponding to European Patent Application No. 13158863.4 on Aug. 2, 2013.

Chinese Office Action for Corresponding Chinese Application No. 201310082245.9 issued on Nov. 27, 2015. (Office Action Translation submitted herewith.)

Mingxing Tian, "Application Research on Path Planning in Vehicle Navigation System", Chinese Master's Theses Full-text Database Engineering Science and Technology II, No. 11, pp. 1-56, Nov. 15, 2009. See Translation of Chinese Office Action. Additional translations of document will be submitted upon receipt by undersigned).

Partial English Translation of "Mingxing Tian, Application Research on Path Planning in Vehicle Navigation System", Chinese Master's Theses Full-text Database Engineering Science and Technology II, No. 11, pp. 1-56, Nov. 15, 2009. (previously submitted).

\* cited by examiner

| RANGE SCALE | SEARCH METHOD |
|---|---|
| $D \leq T1$ | VERY-CLOSE-RANGE SEARCH |
| $T1 < D \leq T2$ | CLOSE-RANGE SEARCH |
| $T2 < D \leq T3$ | MEDIUM-RANGE SEARCH |
| $T3 < D$ | LONG-RANGE SEARCH |

F I G. 4 A

| | | |
|---|---|---|
| PATTERN A | FIRST LEVEL | NATIONAL ROADS, PRINCIPAL LOCAL ROADS, GENERAL PREFECTURAL ROADS, GENERAL CITY STREETS IN GOVERNMENT-DESIGNATED LARGE CITY, LOCAL STREETS AND ROADS, OTHER ROADS |

| | | |
|---|---|---|
| PATTERN B | THIRD LEVEL | EXPRESSWAYS, NATIONAL ROADS, PRINCIPAL LOCAL ROADS |
| | SECOND LEVEL | GENERAL PREFECTURAL ROADS, GENERAL CITY STREETS IN GOVERNMENT-DESIGNATED LARGE CITY |
| | FIRST LEVEL | LOCAL STREETS AND ROADS, OTHER ROADS |

| | | |
|---|---|---|
| PATTERN C | FOURTH LEVEL | EXPRESSWAYS, NATIONAL ROADS |
| | THIRD LEVEL | PRINCIPAL LOCAL ROADS |
| | SECOND LEVEL | GENERAL PREFECTURAL ROADS, GENERAL CITY STREETS IN GOVERNMENT-DESIGNATED LARGE CITY |
| | FIRST LEVEL | LOCAL STREETS AND ROADS, OTHER ROADS |

| | | |
|---|---|---|
| PATTERN D | FOURTH LEVEL | EXPRESSWAYS |
| | THIRD LEVEL | NATIONAL ROADS, PRINCIPAL LOCAL ROADS |
| | SECOND LEVEL | GENERAL PREFECTURAL ROADS, GENERAL CITY STREETS IN GOVERNMENT-DESIGNATED LARGE CITY |
| | FIRST LEVEL | LOCAL STREETS AND ROADS, OTHER ROADS |

F I G. 4 B

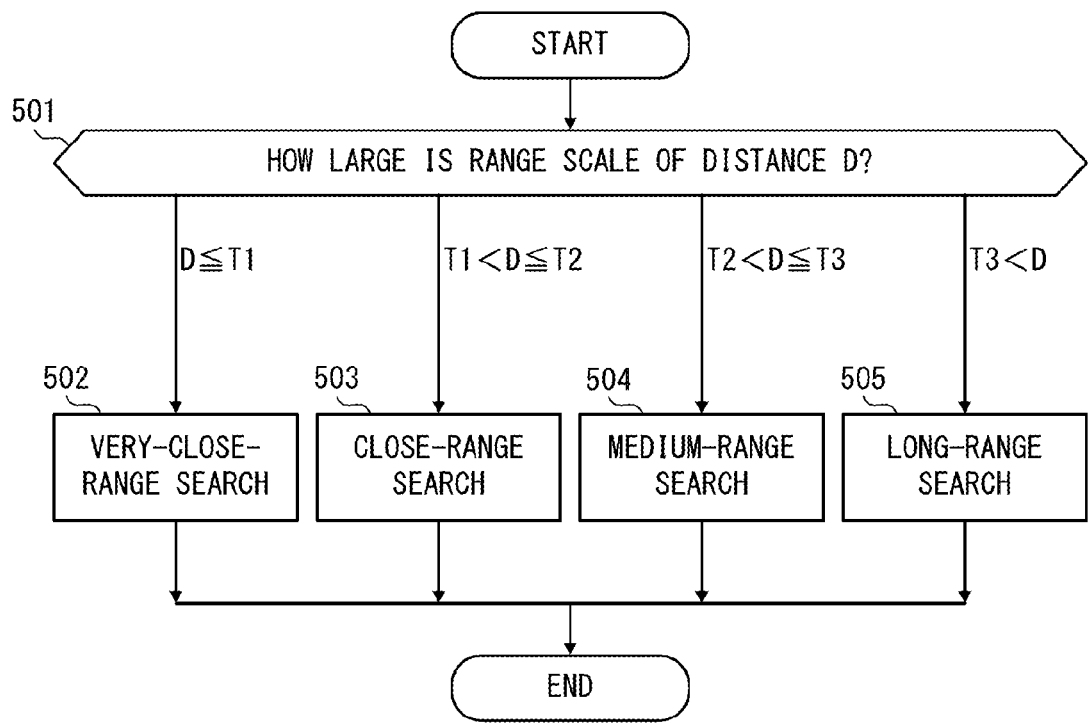
F I G. 5

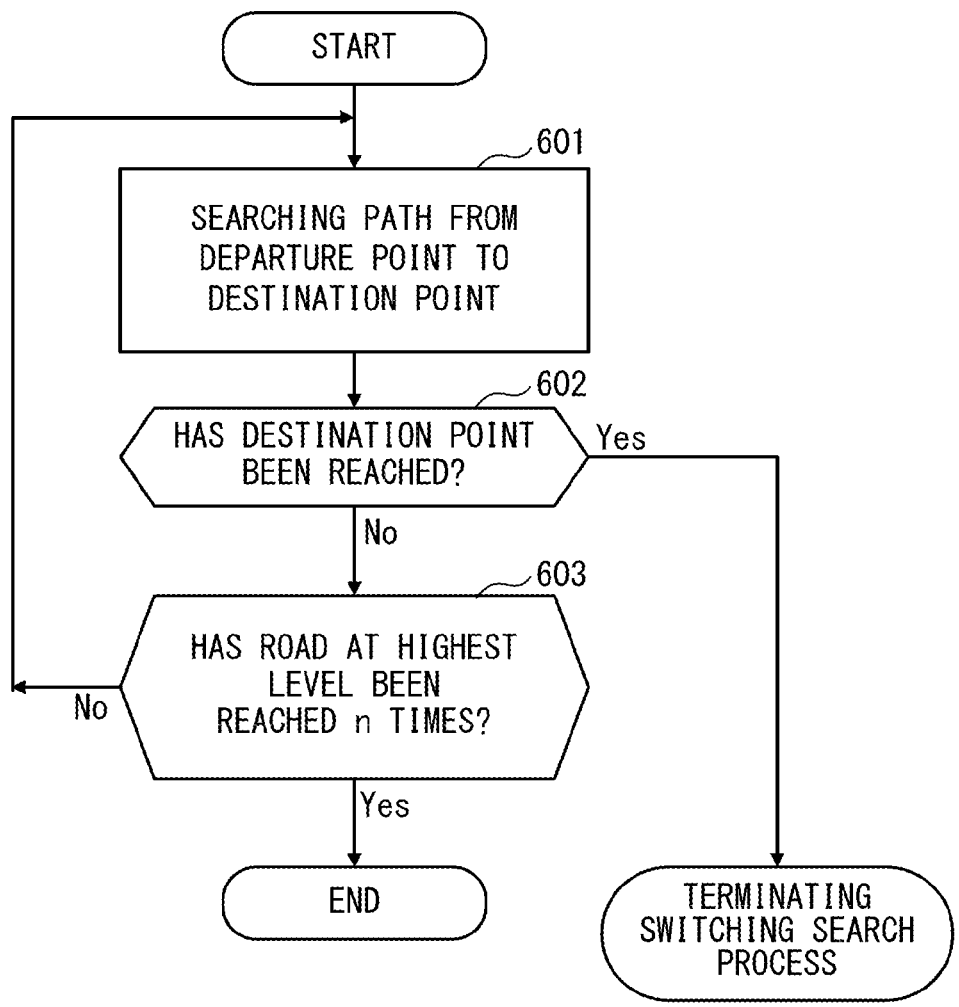
F I G. 6

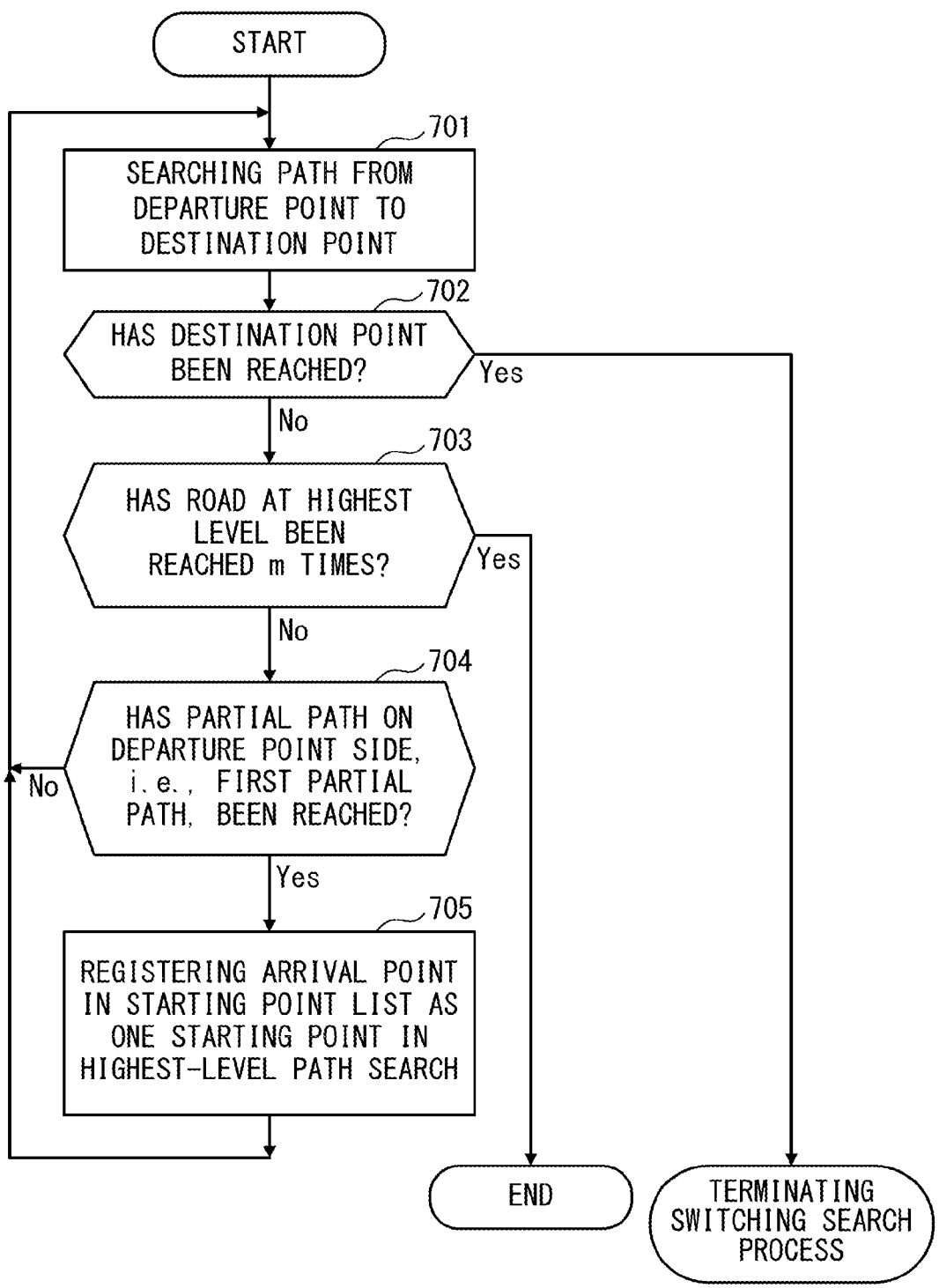
F I G. 7

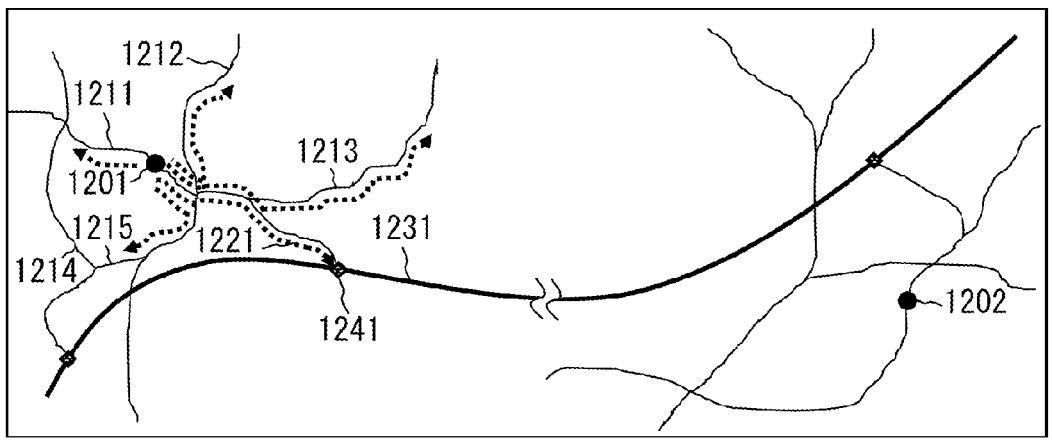
F I G. 12

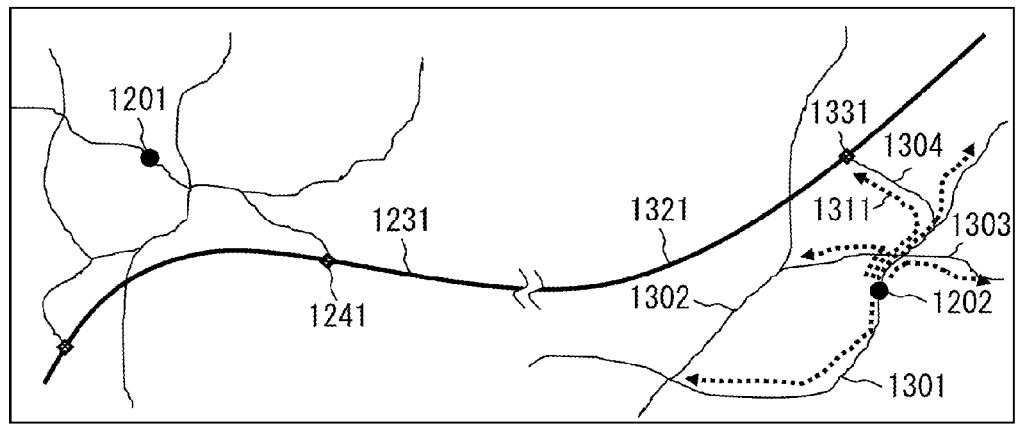
F I G. 13

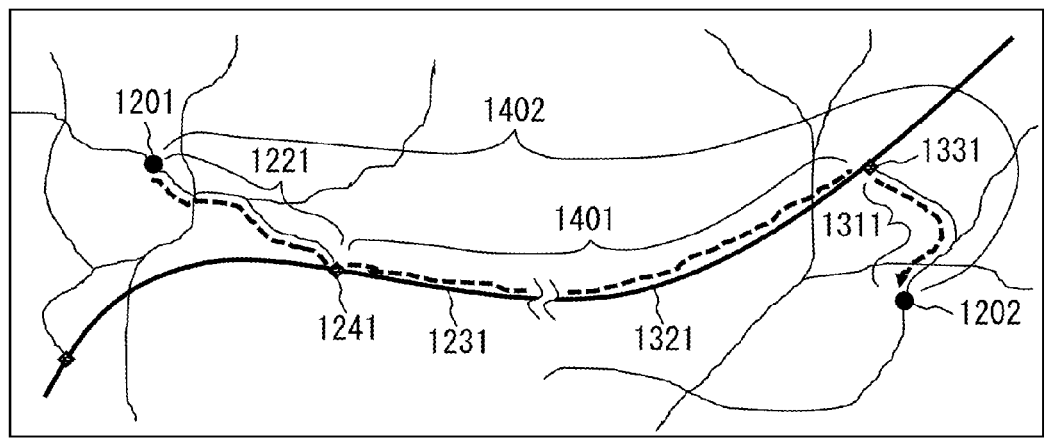
F I G. 1 4

| CANDIDATE PATH | COST VALUE |
|---|---|
| z — y — w | 4 |
| z — y — v — s | 6 |
| z — y — t | 7 |

FIG. 16

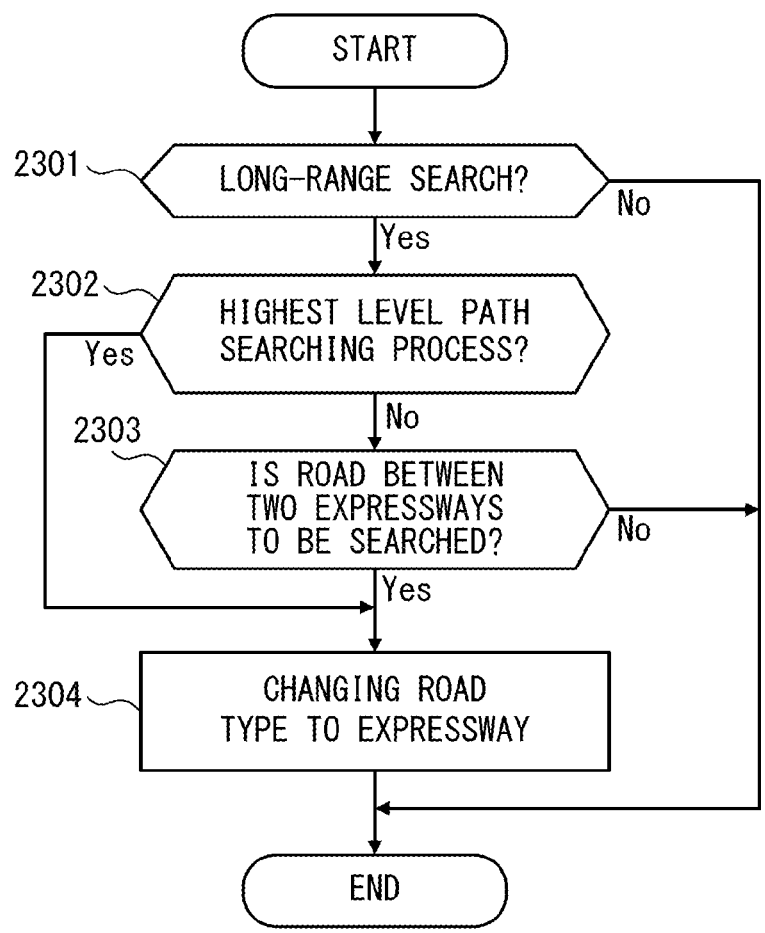
F I G. 2 1

PATH SEARCHING METHOD AND PATH SEARCH DEVICE

CROSS-REFERENCE TO RELATED APPLICATION

This application is based upon and claims the benefit of priority of the prior Japanese Patent Application No. 2012-059452, filed on Mar. 15, 2012, the entire contents of which are incorporated herein by reference.

FIELD

The embodiments discussed herein relate to a path searching method, path search device, and a recording medium.

BACKGROUND

A technique is known in which when a path from a departure point to a destination point according to the map information is searched for, roads are classified into one of two or more levels depending on the road type and one level is selected therefrom. In this technique, a tentative departure point and a tentative destination point on the road network of the selected level are calculated, and a path from the departure point to the destination point is calculated by utilizing in combination the shortest path on the subject road network, a connection path from the departure point to the tentative departure point, and a connection path from the tentative destination point to the destination point. The path-searching period may be shortened by limiting the search target to roads at one level.

As path searching algorithms based on a cost, various kinds of algorithms such as Dijkstra's algorithm and the A* algorithm are known.

In Dijkstra's algorithm, a path with the lowest cost may be efficiently calculated by setting a cost to each edge between nodes and calculating a combination of edges at which the cost is relatively small as a candidate path from a beginning node to an end node.

The A* algorithm is a modified Dij kstra's algorithm for further improved efficiency. In the A* algorithm, a path with the lowest cost is searched for by adding to the cost of Dijkstra's algorithm an estimated value (heuristic value) of the cost of reaching an end node. Accordingly, the area to be searched may be narrowed down to improve the efficiency of processing.

Patent Document 1: Japanese Laid-open Patent Publication No. 06-052237

Non-patent Document 1:E. W. Dijkstra, "A Note on Two Problems In Connexion with Graphs", Numerische Mathematik 1, pp. 269-271, 1959.

Non-patent Document 2:P. E. Hart, N.J. Nilsson, B. Raphael, "A Formal Basis for the Heuristic Determination of Minimum Cost Paths", IEEE Transactions of Systems Science and Cybernetics, Vol. SSC-4, No. 2, pp. 100-107, 1968.

SUMMARY

According to an aspect of the embodiments, firstly, a path searching method performed by a computer determines to which of a plurality of levels each of a plurality of road types for which a path search is performed corresponds, according to a distance between a departure point and a destination point. Next, the path searching method performs, by using a processor, a first path search for the road type associated with a first level among the plurality of levels from the departure point to the destination point, and a second path search for the road type associated with the first level from the destination point to the departure point. Next, the path searching method performs, by using the processor, a third path search for the road type associated with a second level among the plurality of levels according to a point obtained in the first path search and a point obtained in the second path search. Then, the path searching method generates path information according to a result of the first path search, the second path search, and the third path search.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A is a diagram (1) illustrating operational parameters.

FIG. 4B is a diagram (2) illustrating operational parameters.

FIG. 5 is a flowchart of the process of determining a level.

FIG. 6 is a flowchart of the first partial path searching process.

FIG. 7 is a flowchart of the second partial path searching process.

FIG. 12 is a diagram illustrating the first partial path search in a long-range search.

FIG. 13 is a diagram illustrating the second partial path search in a long-range search.

FIG. 14 is a diagram illustrating a path search at the highest level in a long-range search.

FIG. 16 is a diagram of partial paths.

FIG. 21 is a flowchart of a type changing process.

DESCRIPTION OF EMBODIMENTS

In the conventional path search technique above, the path-searching period is shortened by limiting the search target to roads at one level. However, there are problems as follows.

In the method where roads are classified into one level depending on the type of road, the level to which each road belongs is determined in a fixed manner for each type of road. Accordingly, roads of the same type are classified into the same group (level) at all times and a path search is performed regardless of whether the distance between a departure point and a destination point is long or short.

Note that such a problem is also present when path searching algorithms other than Dijkstra's algorithm and the A* algorithm are used.

The inventors have found that if the grouping of roads could be dynamically changed depending on the distance between a departure point and a destination point, the roads to be searched might be controlled in a more flexible manner depending on whether the distance is long or short.

Some embodiments will be described below in detail with reference to the accompanying drawings.

Figure 1:
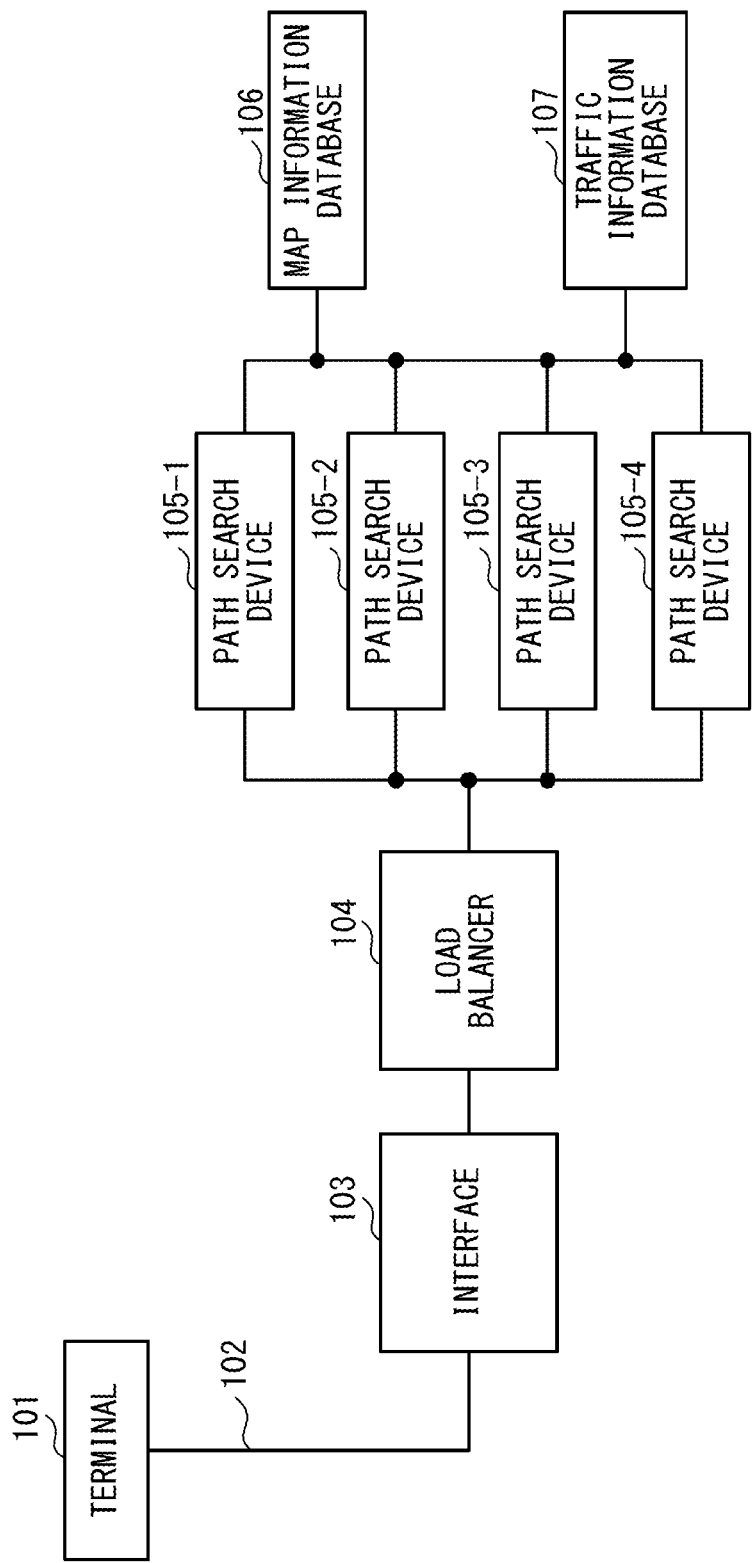
FIG. 1 is a block diagram illustrating a path search system.

FIG. 1 illustrates an example of the configuration of a path search system including two or more path search devices. The path search system of FIG. 1 includes an interface 103, a load balancer 104, path search devices 105-1 to 105-4, a map information database 106, and a traffic information database 107.

The terminal 101 is an information processing apparatus such as a server, a personal computer, or a mobile terminal, which are used by a user, and the terminal 101 accesses the interface 103 via a wired or wireless communication network 102. The terminal 101 transmits to the interface 103 a path search request that includes the information about a departure point and a destination point.

The interface 103 is an information processing apparatus that receives a path search request, and the interface 103 transfers the received path search request to the load balancer 104. The load balancer 104 is an information processing apparatus that distributes two or more path search requests, and the load balancer 104 transmits the path search request transferred from the interface 103 to one of the path search devices 105-1 to 105-4 according to a specified load balancing algorithm.

The map information database 106 stores the map information including the road information of two or more roads therein. The road information of the roads includes the positional information of two or more nodes included in the roads and the information of road links that correspond to edges between the nodes.

A node indicates a breakpoint at which a road is split including a point like an intersection at which a road branches. Segments of one road delimited by nodes are road links. In the cases where one road on the map is divided into opposed segments such as an up line and a down line, links that are independent from each other and of which the direction is defined may be set for consideration. Alternatively, links for which the direction is not defined may be set on one road for consideration. The road information of the roads includes the information about the road types. Hereinafter, a road link may be referred to simply as a link. The terms "vertex" and "edge" are used in graph theory in mathematics, but they will be expressed as "node" and "link" in the following description.

The traffic information database 107 stores traffic information including the cost of each link. As the cost of each link, for example, the distance between both ends of a link (i.e., the length of a link), the period of time required to travel between both ends of a link along the link, or a cost in which the length of link is combined with the period of time required for travel is used. Even if the lengths of links are the same, the period of time required for the movement may vary depending on conditions such as the type of the road to which the link belongs, the positions of the links, the date and time of the movement on the links, or the like.

Each of the path search devices 105-1 to 105-4 is an information processing apparatus that performs a path searching process, and calculates a path from a departure node to a destination node according to the received path search request, the map information in the map information database 106, and the map information in the traffic information database 107. Then, each of the path search devices 105-1 to 105-4 creates path information that indicates the calculated path, and transmits the created path information to the load balancer 104. The path information is then transmitted to the terminal 101 through the interface 103 and the communication network 102.

The terminal 101 transmits to another information processing apparatus the information used to display the path that is indicated by the received path information, or displays the path on a screen.

Figure 2:
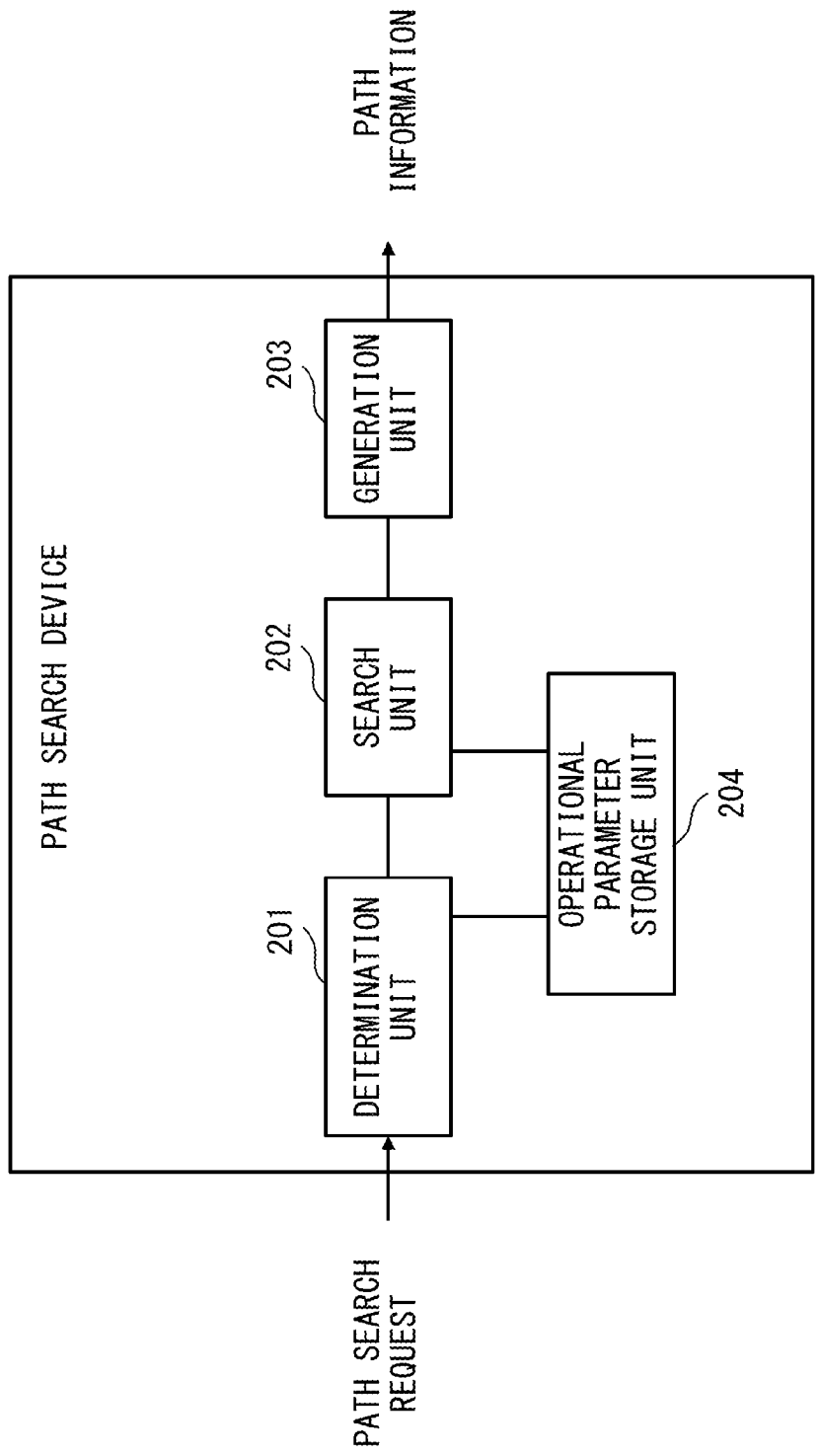
FIG. 2 is a functional block diagram illustrating a path search device.

FIG. 2 illustrates an example of the functional configuration of the path search devices 105-1 to 105-4 of FIG. 1. The path search devices 105-1 to 105-4 have a similar functional configuration in common, and each of the path search devices 105-1 to 105-4 is referred to as the path search device 105. The path search device 105 of FIG. 2 includes a determination unit 201, a search unit 202, a generation unit 203, and an operational parameter storage unit 204.

The operational parameter storage unit 204 stores an operational parameter that is referred to by the determination unit 201 and the search unit 202. An operational parameter includes the information on two or more range scales and the information on the grouping of roads according to each range scale. The grouping of road types indicates the relationship between each road type and one level among two or more levels.

The path search system of FIG. 1 includes one terminal 101, but two or more terminals may be included in a path search system according to the present embodiment. Moreover, the path search system of FIG. 1 includes four path search devices 105-1 to 105-4, but the number of the path search devices included in a path search system according to the present embodiment may be equal to or less than three, or may be equal to or greater than five. In actuality, the number of path search devices is determined according to the load on the system. In cloud computing, the number of path search devices may be increased or decreased in a flexible manner.

Instead of implementing the path search devices as independent information processing apparatuses, the path search devices may be implemented as virtual machines that operate in the same information processing apparatus or in different information processing apparatuses. Two or more path search requests may be processed by batch processing instead of being processed in real time in an independent manner.

The inventors considered utilizing algorithms such as Dijkstra's algorithm and the A* algorithm when developing a path search system. The inventors have found that if Dijkstra's algorithm or the A* algorithm is implemented on a system, the number of nodes or links to be searched for increases as the area in which a path is to be searched for becomes broader, and that the processing time becomes longer as a result. To address this problem, the inventors have found that it is preferable to introduce two ideas in order to reach a solution in a realistic processing time.

The first idea corresponds to a technique disclosed in the conventional technique. That is, upon the classification of the roads into two or more levels according to the type of road, firstly, a path from a departure point to a tentative departure point on a higher-level road network is searched for by using the lowest-level road network, and in a similar manner, a path from a destination point to a tentative destination point on an even higher-level road network is searched for. Then, a path that establishes a connection between the tentative departure point and the tentative destination point is searched for on the higher-level road network. The number of nodes or links included in a higher-level road network is generally smaller than the number of nodes or links included in a lower-level road network. Accordingly, if this technique is used, roads at a higher level are targeted for search, and it becomes possible to prevent the processing time from being long. Moreover, a path in which the lowest-level road network is used from a departure point to a tentative departure point and from a destination point to a tentative destination point and in which a higher-level road network is then used from the tentative departure point to the tentative destination point is similar to a path that is actually taken by a person when he/she travels by car.

The second idea corresponds to a technique disclosed in the conventional technique. That is, when a search is performed in such a manner as above, two or more administrative road types are considered to be at the same level.

In consideration of the ideas discussed above, the inventors have further realized that it is preferable to introduce an additional mechanism in order to reach a solution in a realistic processing time. Firstly, the idea is to be considered in which when the road types are classified into two or more levels, the way of classification is changed according to the area to be searched. Here, it is not necessary to classify roads into two or more levels in accordance with the administrative road types, and as a matter of course, each road may be associated with any level in an independent manner.

As an alternative, the idea is to be considered in which the range scale to be searched is divided into a few stages and the way of searching is varied for every range scale.

Figure 3:
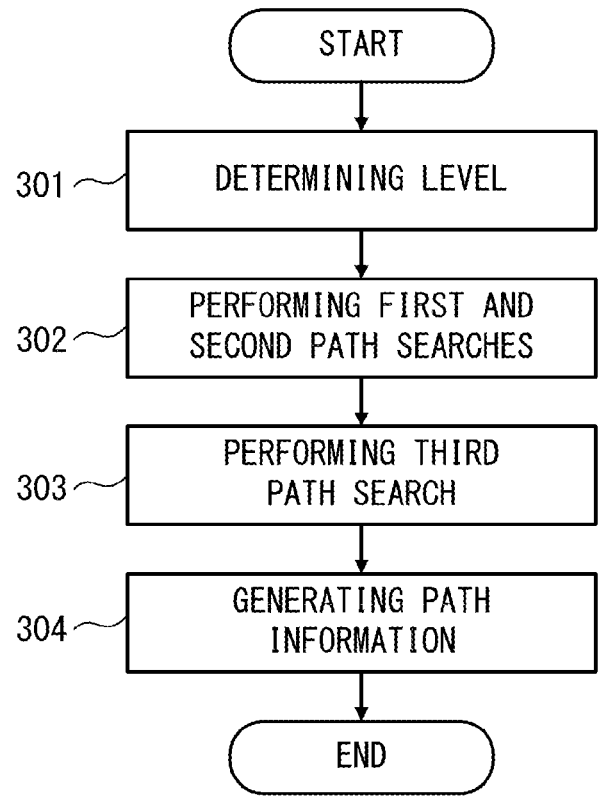
FIG. 3 is a flowchart of a path searching process.

FIG. 3 is a flowchart illustrating an example of the path searching process performed as the processing units in the path search device 105 of FIG. 2 co-operate. In the process of searching for a path according to the present embodiment, it is needless to say that the two points are not necessarily the points from which a user of the terminal 101 actually departs or at which a user of the terminal 101 actually arrives as long as a path is searched for between the two points. In the following description, the term departure point or departure node, and the term destination point or destination node will be used. These terms are an example of the first node at which the search process starts and an example of the second node at which the search process terminates, respectively.

Firstly, the determination unit 201 compares the distance between a departure point and a destination point included in the path search request with two or more range scales included in an operational parameter, and determines to which of two or more levels each of two or more road types for which a path search is performed belongs (step 301). In so doing, the level to be associated with each road type is determined according to the grouping that corresponds to a range scale including the distance between a departure point and a destination point. As a method to calculate distance, the straight-line distance between a departure point and a destination point may be calculated, for example, from the latitude/longitude of the departure point and the latitude/longitude of the destination point.

Next, the search unit 202 performs, according to the determined level of each road type, the first path search for the road type associated with the first level from a departure node to a destination node, and performs the second path search for the road type associated with the first level from the destination node to the departure node (step 302). Then, the search unit 202 performs the third path search for the road type associated with the second level according to the point obtained in the first path search (i.e., a node as an intermediate arrival point in the path search) and the point obtained in the second path search (i.e., a node as another intermediate arrival point in the path search) (step 303).

Next, the generation unit 203 generates path information according to the results of the first path search, the second path search, and the third path search (step 304). The generated path information includes the node and road link information that indicate the path from a departure node to a destination node.

The process in step 301 is based on the idea of changing the way of classification according to the area to be searched when the road types are classified into two or more levels. According to such a path search system, the grouping of road types may be dynamically changed according to the distance between a departure point and a destination point, and thus the road type to be searched in the first path search, the second path search, and the third path search may be more flexibly and more precisely changed.

It is to be noted that the level of road type to be searched in each of the first path search, the second path search, and the third path search is not necessarily limited to one level. Moreover, the level of road type to be searched is not necessarily the same between the first path search and the second path search. Further, the search method in step 302 or step 303 may be changed according to the distance between a departure point and a destination point.

FIG. 5 is a flowchart depicting an example of the process of determining a level in step 301 of FIG. 3 by using an operational parameter of FIGS. 4A and 4B. FIGS. 4A and 4B will be described later.

The determination unit 201 uses the map information to calculate a distance D between a departure point and a destination point, for example, by using the latitude/longitude of the departure point and the latitude/longitude of the destination point. As distance D, the straight-line distance between these two points may be used. The distance D is compared with two or more thresholds, and in which range scale "D" is included is determined (step 501).

When "D" is equal to or less than threshold T1 (D≤T1), i.e., when "D" is included in the first range scale, the search method is determined to be the very-close-range search, and the level of each road is determined according to the grouping that is associated with the very-close-range search (step 502). When "D" is greater than the threshold T1 and is equal to or less than the threshold T2 (T1<D≤T2), i.e., when "D" is included in the second range scale, the search method is determined to be the close-range search, and the level of each road is determined according to the grouping that is associated with the close-range search (step 503).

When "D" is greater than the threshold T2 and is equal to or less than the threshold T3 (T2<D≤T3), i.e., when "D" is included in the third range scale, the search method is determined to be the medium-range search, and the level of each road is determined according to the grouping that is associated with the medium-range search (step 504). When "D" is greater than the threshold T3 (T3<D), i.e., when "D" is included in the fourth range scale, the search method is determined to be the long-range search, and the level of each road is determined according to the grouping that is associated with the long-range search (step 505).

FIGS. 4A and 4B illustrate an example of the operational parameters stored in the operational parameter storage unit 204 of FIG. 2. In the example of FIG. 4A, the four search methods, the very-close-range search, the close-range search, the medium-range search, and the long-range search, are defined according to the range scale to which the distance D between a departure point and a destination point belongs.

In the example of FIG. 4B, the association between the road type and each level is defined in two or more patterns. In FIG. 4B, expressways, national roads, principal local roads, general prefectural roads, general city streets in a government-designated large city, local streets and roads, and other roads, which are based on the provisions of the Road Act or the like, are depicted. Expressways include not only national expressways but also urban expressways. National roads correspond to, for example, general national roads, i.e., the national roads that are not expressways but general roads. The categories used in the country in which a path search is to be performed may be used as the types of road. The information about the road type associated with each road, which is stored in the map information database 106, is one of these types of road. The range scales that correspond to the respective search methods are as follows.

(1) Very-close-range search: the first range scale in which the distance D is equal to or less than the threshold T1.

(2) Close-range search: the second range scale in which the distance D is greater than the threshold T1 and is equal to or less than the threshold T2.

(3) Medium-range search: the third range scale in which the distance D is greater than the threshold T2 and is equal to or less than the threshold T3.

(4) Long-range search: the fourth range scale in which distance D is greater than the threshold T3.

Moreover, the following way of classification may be adopted as the grouping of roads.

(1) Pattern A

First level: national roads, principal local roads, general prefectural roads, general city streets in a government-designated large city, local streets and roads, and other roads (2) Pattern B Third level: expressways, national roads, and principal local roads Second level: general prefectural roads, and general city streets in a government-designated large city First level: local streets and roads, and other roads (3) Pattern C Fourth level: expressways and national roads Third level: principal local roads Second level: general prefectural roads, and general city streets in a government-designated large city First level: local streets and roads, and other roads (4) Pattern D Fourth level: expressways Third level: national roads, and principal local roads Second level: general prefectural roads, and general city streets in a government-designated large city First level: local streets and roads, and other roads Then, as the association between the range scale and the grouping pattern, for example, pattern A, pattern B, pattern C, and pattern D may be associated with the very-close-range search, the close-range search, the medium-range search, and the long-range search, respectively. When a search process is performed according to the distance between a departure point and a destination point, for example, the search may be divided into several phases and then be performed. Further, the pattern to be used may be varied according to the phase.

In FIG. 4A, threshold T1, threshold T2, and threshold T3 correspond to values from, for example, the range between 500 m to 1500 m, the range between 3000 m to 10 km, and the range between 30 km to 100 km, respectively. In the example of FIG. 4A, the range scale is divided into four, but the range scale may be divided into three or less, or five or more. Moreover, the number of levels in each group depicted in FIG. 4B may be smaller or greater than the number of levels in FIG. 4B. The thresholds of the range scale and the types of road in each level of grouping are set as operational parameters.

According to the process of determining a level as illustrated in FIG. 5, if the example above is applied for example, national roads are grouped into the third level when a long-range search is performed, and are grouped into the fourth level when a medium-range search is performed. Further, the national roads are grouped into the third level when a close-range search is performed, and are grouped into the first level when a very-close-range search is performed. In other words, according to such a process of determining a level, the same level of road type may be dynamically changed according to the distance between a departure point and a destination point, and thus it becomes easier to calculate a path according to the distance.

The following search techniques may be applied to the search methods above.

(1) Very-close-range search

The roads of all road types excluding expressways are classified into the same level (first level), i.e., for all the roads, a path search is performed from a departure node to a destination node by using Dijkstra's algorithm, the A* algorithm, or the like. When the departure point or destination point is included in an expressway, however, the expressway is added to the first level and then a path search is performed.

(2) Close-range Search

Firstly, as the first path search, a search is performed on a road level hierarchy from a departure node to a destination node for a higher level, and the search reaches a certain road level. For the explanation, this certain road level is referred to as Λ (lambda). A lower road level than Λ is to be searched in the first path searching process, but after a node x1 at a higher level is reached in the road level lower than Λ, links at that higher level are to be searched for from the node x1 in the following search process.

In the first path searching process, one or more candidate partial paths are obtained, and the obtained group of candidate partial paths is referred to as P1. Moreover, the road network composed of the set of the road links that constitute the candidate partial paths of P1 over the entirety of P1 is referred to as U1. Further, the group of nodes at which P1 is connected to roads at the level Λ is referred to as N1.

Next, as the second path search, a search is performed on a road level hierarchy from the destination node to the departure node for a higher level, and the search reaches the level Λ. In a similar manner to the first path search, a lower road level than Λ is to be searched also in the second path searching process, but after a node x2 at a higher level is reached in the road level lower than Λ, links at that higher level are to be searched for from the node x2 in the following search process.

One or more candidate partial paths are obtained in the second path searching process, and this group of candidate partial paths is referred to as P3. Moreover, the road network composed of the set of the road links that constitute the candidate partial paths of P3 over the entirety of P3 is referred to as U3. Further, the group of nodes at which P3 is connected to roads at the level Λ is referred to as N3.

Next, as the third path search, it is determined that the network composed of "roads at the level Λ, which are connected to N1 and N3" is "U2", and that the entire network composed of U1, U2, and U3 is "U", a path "p" connecting between the departure node and the destination node through a group of links on "U" is obtained.

In each of the first path search, the second path search, and the third path search, Dijkstra's algorithm, the A* algorithm, or the like may be used. Moreover, in each of the path searches, two or more levels of roads may be searched.

(3) Medium-range Search

A path search may be divided into two or more phases and then be performed. In other words, a path search may be divided into the two phases and then be performed, where the two phases include the first path search in which an outline path from a departure node to a destination node is calculated and the second path search in which a detailed path within an area to be searched that is limited according to the result of the first path search is calculated.

Firstly, in first path search, the road types that are associated with a higher level (typically, the highest level) are limited to a few types (for example, only expressways and national roads).

Next, in the second path search, an area including the path obtained in the first path search is set. An area to be set includes, for example, "a set of one or more spatially continuous rectangular areas that cover the path obtained in the first path search", "a set of one or more spatially continuous rectangular areas that cover a line segment connecting between a departure point and a destination point", or "the sum of these sets of rectangular areas", or "the sum of the above sum and a set of rectangular areas that cover 'a portion that is not covered by the rectangular areas but is surrounded by the rectangular areas' when the above sum is spatially expanded" may be used. Then, a path search is performed in the set area. In the second path search, the number of the road types that are associated with a higher level (typically, the highest level) is increased compared to the first path search. Then, a path obtained as a result of the second path search is adopted as the search result of the whole medium distance path search.

(4) Long-range Search

Firstly, a group of candidate entrances E to expressways close to the departure node is calculated. As the group of candidate entrances E, entrances may be chosen from, for example, "entrances that are closest to the departure node" or "entrances whose values of 'the straight-line distance between the departure node and one entrance+the straight-line distance between the one entrance and the destination node' are the smallest among the entrances that are closest to the departure node".

Then, the above-described very-close-range search or close-range search is performed from the departure node to "E". As a result, a group of candidate partial paths is obtained as a part of the entire long-range search. For the explanation, such a group of candidate partial paths will be referred to as "R1". Moreover, a road network composed of the set of road links over the entire R1, which are included in the candidate partial paths of R1, is referred to as "W1". The group of nodes at which R1 connects to expressways is "E".

Next, a group of candidate exits S from expressways close to the destination node is calculated. As the group of candidate exits S, exits may be chosen from, for example, "exits that are closest to the destination node" or "exits whose values of 'the straight-line distance between the departure node and one exit+the straight-line distance between the one exit and the destination point' are the smallest among the exits that are closest to the destination node".

Then, the above-described very-close-range search or close-range search is performed from the destination node to "S". As a result, a group of candidate partial paths is obtained as a part of the entire long-range search. For the explanation, such a group of candidate partial paths will be referred to as "R3". Moreover, a road network composed of the set of road links over the entire R3, which are included in the candidate partial paths of R3, is referred to as "W3". The group of nodes at which R3 connects to expressways is "S".

Next, the network composed of the "expressways that connect to 'E' or 'S'" is referred to as "W2", and the entire network composed of W1, W2, and W3 is referred to as "W". Then, Dijkstra's algorithm, the A* algorithm, or the like is used to calculate a path "r" that establishes a connection between the departure node and the destination node through the group of links on "W". A result of this calculation is adopted as a search result of the entire long-range search.

The above-described path searching methods by distance will be expressed in an alternative way. In each of the close-range search, medium-range search, and long-range search, firstly, the path search is performed for the road at the lowest level that is connected to the departure point. Then, once a road at a higher level is reached in the path search being performed for the roads at lower levels, the process of switching the path search to a path search to be performed for the roads at a higher level is repeated. Accordingly, a partial path on the departure point side may be obtained as a partial path that establishes a connection between the departure node and a road at the highest level. In a similar manner, a partial path on the destination point side may be obtained as a partial path that establishes a connection between the destination node and a road at the highest level. Further, an intermediate partial path may be obtained as a path that passes through a road at the highest level and exists between a partial path on the departure point side and a partial path on the destination point side to connect the partial paths on both sides. Finally, the entire path whose starting point is the departure point and that connects a partial path on the departure point side, a partial path on the destination point side, and an intermediate partial path to establish a connection between the departure point and the destination point is obtained.

Note that a partial path on the destination point side is calculated in advance as an independent step before an intermediate partial path is obtained because an entrance to the partial path on the destination point side may not be found if a path is calculated in the order of the partial path on the departure point side, an intermediate partial path, and the partial path on the destination point side. In other words, it is hard to decide when to start calculating the partial path on the destination point side if the timing is dependent on the calculation progress of the intermediate partial path.

Note that there may be cases in which a node on a road at a higher level by two or more levels is searched for while a path search is being performed for a road type at a lower level. For example, once a node on a road at the third level is searched for while a path search is being performed for a road type at the first level, anode on a road at the third level may be searched for in the following search processes.

A road at which a departure node or a destination node is placed is not necessarily limited to a road at the first level, but may belong to the road type at the second level or higher.

Figure 8:
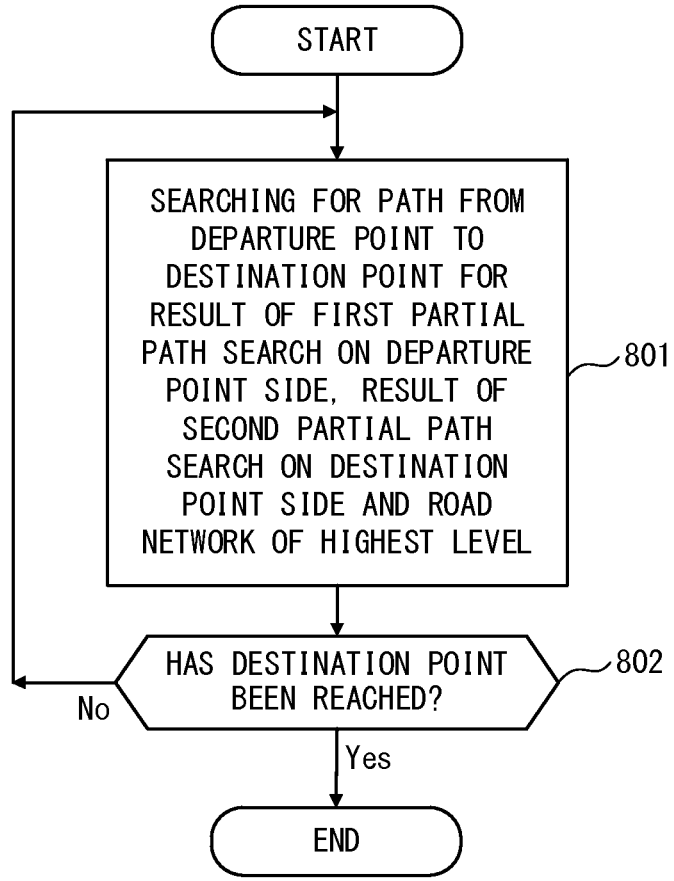
FIG. 8 is a flowchart of a path searching process at the highest level.

FIGS. 6 through 8 are flowcharts of an example of the switching search process in steps 302 and 303 of FIG. 3 in which operational parameters of FIG. 4 are used to switch the levels and then a path search is performed. FIG. 6 is a flowchart of the first partial path searching process in which a partial path is obtained that establishes a connection between the departure point and a road at the highest level in the target range scale, which corresponds to the first path search in step 302. FIG. 7 is a flowchart of the second partial path searching process in which a partial path is obtained that establishes a connection between the destination point and a road at the highest level in the target range scale, which corresponds to the second path search in step 302. FIG. 8 is a flowchart of the highest level path searching process for a road at the highest level in the target range scale, which corresponds to step 303.

The number of partial paths n ("n" is an integer equal to or greater than 1) calculated in the first partial path searching process and the number of partial paths m ("m" is an integer equal to or greater than 1) calculated in the second partial path searching process are set as operational parameters. As the path searching algorithm, for example, Dijkstra's algorithm or the A* algorithm is used, and the information of nodes that become passing-through node candidates (i.e., nodes through which answer path candidates pass) is stored in an open list while the search is in progress. The term "open list" refers to the information in which the information of nodes through which candidate paths pass as answer path candidates is associated with cost values of these candidate paths.

In the first partial path searching process, firstly, the search unit 202 refers to the grouping of roads given as operational parameter values, which corresponds to the determined search method, to search for a partial path that establishes a connection between the departure point and a road at the highest level (step 601 in FIG. 6). In the search for a partial path, roads at the lowest level to the second highest level are targeted from the two or more roads included in the map information. Once a road at a higher level is reached in the partial path search, the process of switching the search so as to perform a search for the roads at the reached level is repeated. In step 601, the process of following one road link between a pair of adjacent nodes along the targeted road is performed as a step of such a search. Next, the search unit 202 checks whether or not the destination point has been reached by tracking the road links (step 602). When the destination point has been reached (step 602, "Yes"), the switching search process is terminated because a path from the departure node to the destination node is found.

When the destination point has not yet been reached (step 602, "No"), the search unit 202 checks whether or not the number of times a road at the highest level has been reached thus far in the processing is "n" (step 603). When the number of times a road at the highest level has been reached is less than "n" (step 603, "No"), the processes of step 601 and the following steps are repeated. When the number of times a road at the highest level has been reached is "n" (step 603, "Yes"), the first partial path searching process is terminated. Accordingly, n partial paths as well as n nodes that are endpoints of each partial path and are arrival points on a road at the highest level (n.b., these arrival points correspond to intermediate arrival points in the entire path search) are obtained. These nodes are endpoints of the links on one of the roads at the highest level.

In the second partial path searching process, firstly, the search unit 202 refers to the grouping of roads given as operational parameter values, which corresponds to the determined search method, to search for a partial path that establishes a connection between the destination point and a road at the highest level (step 701 in FIG. 7). In the search for a partial path, roads at the lowest level to the second highest level are targeted from the two or more roads included in the map information. Once a road at a higher level is reached in the partial path search, the process of switching the search so as to perform a search for the roads at the reached level is repeated. In step 701, the process of following one road link between a pair of adjacent nodes along the targeted road is performed as a step of such a search.

Next, the search unit 202 checks whether or not the departure point has been reached by tracking the road links (step 702). When the departure point has been reached (step 702, "Yes"), the switching search process is terminated because a path from the departure node to the destination node is found.

When the departure point has not yet been reached (step 702, "No"), the search unit 202 checks whether or not the number of times a road at the highest level has been reached thus far in the processing is "m" (step 703). When the number of times a road at the highest level has been reached is less than "m" (step 703, "No"), the search unit 202 checks whether or not one of the n nodes obtained thus far in the first partial path searching process has been reached (step 704). When none of the n nodes has been reached yet (step 704, "No"), the processes of step 701 and the following steps are repeated. When any of the nodes on one of the n partial paths has been reached (step 704, "Yes"), the node of the arrival point is registered in a starting point list as one starting point in a path search at the highest level (step 705), and then the processes of step 701 and the following steps are repeated.

When the number of times a road at the highest level has been reached is m in step 703 (step 703, "Yes"), the second partial path searching process is terminated. Accordingly, m partial paths as well as m nodes that are endpoints of each partial path and are arrival points on a road at the highest level are obtained.

In the path searching process with particular emphasis on the highest level, firstly, the search unit 202 refers to the grouping of roads given as operational parameter values, which corresponds to the determined search method, to search a path with particular emphasis on the roads at the highest level among two or more roads included in the map information (step 801 in FIG. 8).

In this path search, a path from the departure point to the destination point is searched for from the links included in a road network that includes the paths, which are obtained in the first partial path searching process, from the departure point to each of the n nodes, the links included in a road network that includes the paths, which are obtained in the second partial path searching process, from the destination point to each of the m nodes, and the links included in a road network at the highest level to which n nodes and m nodes are connected. Here, the paths obtained in the first partial path searching process may be used as paths from the departure point to the n nodes.

In step 801, the process of following one road link between a pair of adjacent nodes along the targeted road is performed as a step of such a search.

Next, the search unit 202 checks whether or not a node connected to the destination point has been reached by tracking the road links (step 802). When the node connected to the destination point has not yet been reached (step 802, "No"), the search unit 202 repeats the processes of step 801 and the following steps. When the node connected to the destination point has been reached (step 802, "Yes"), the path searching process with particular emphasis on the highest level is terminated because a path from the departure node to the destination node is found.

In the path searching process with particular emphasis on the highest level, a path search between n nodes obtained in the first partial path searching process and m nodes obtained in the second partial path searching process may be performed on an individual basis. However, it is preferred for efficient processing that the partial paths obtained in the first partial path search be considered to be the searched-for candidate paths, and that a path from the departure node to the destination node be obtained in one path search.

Figure 9:
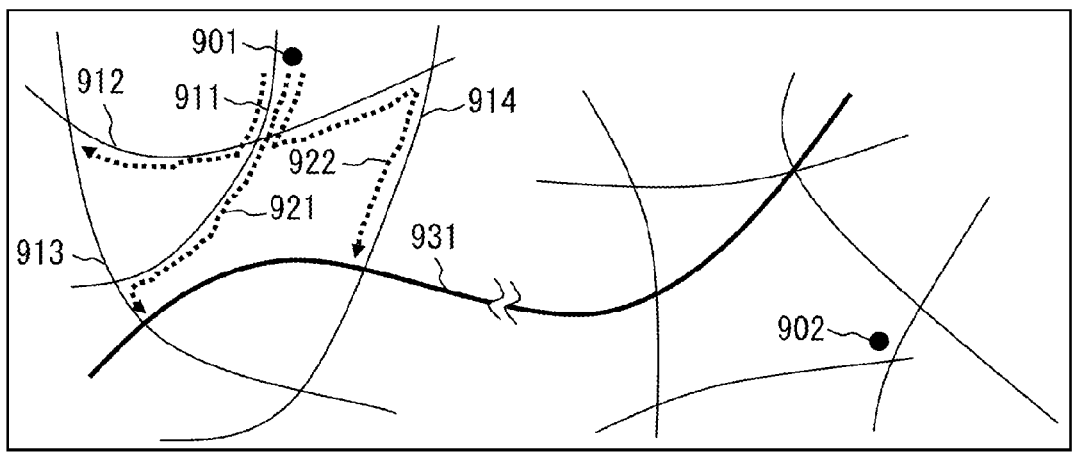
FIG. 9 is a diagram illustrating the first partial path search in a close-range search.

For example, in the case of the close-range search as illustrated in FIG. 9, a path is searched for from roads 911 to 914 at the first level indicated by a thin line in FIG. 9 in the first partial path searching process, and paths 921 and 922 indicated by a dotted lines in FIG. 9 are obtained as partial paths that establish a connection between the departure point 901 to a road 931 at the second level indicated by a bold line in FIG. 9.

It is to be noted that the roads 911 to 914 are not determined to be searched for in advance before a search starts in an area to be searched. As a path is searched for from the departure point 901 to the destination point 902, the roads 911 to 914 are consequently searched. The partial paths 921 and 922 in the first partial path search start from the departure point. Similar considerations apply to the second partial path searching process.

Figure 10:
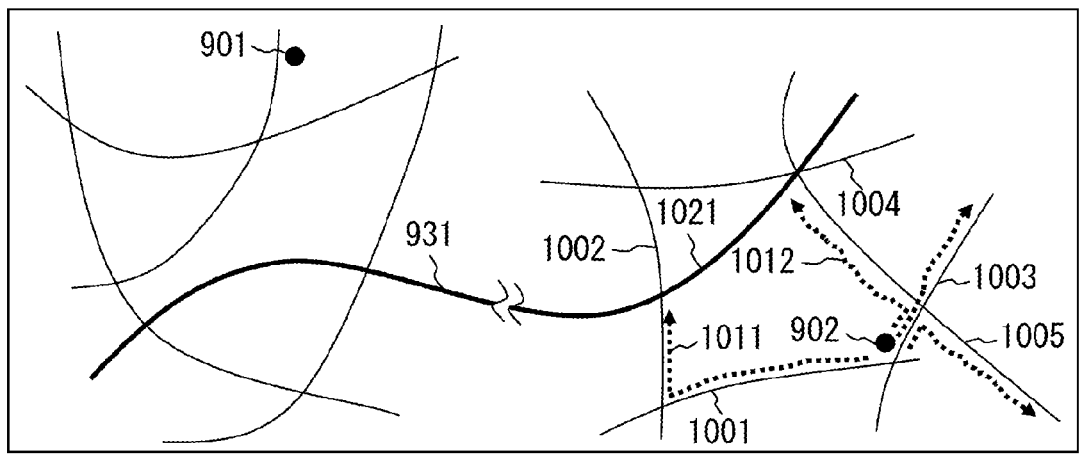
FIG. 10 is a diagram illustrating the second partial path search in a close-range search.

In the second partial path searching process, as illustrated in FIG. 10, a path is searched for from roads 1001 to 1005 at the first level indicated by a thin line in FIG. 10, and partial paths 1011 and 1012 indicated by a dotted line in FIG. 10 are obtained as partial paths that establish connections between the destination point 902 and a road 1021 at the second level indicated by a bold line in FIG. 10.

Figure 11:
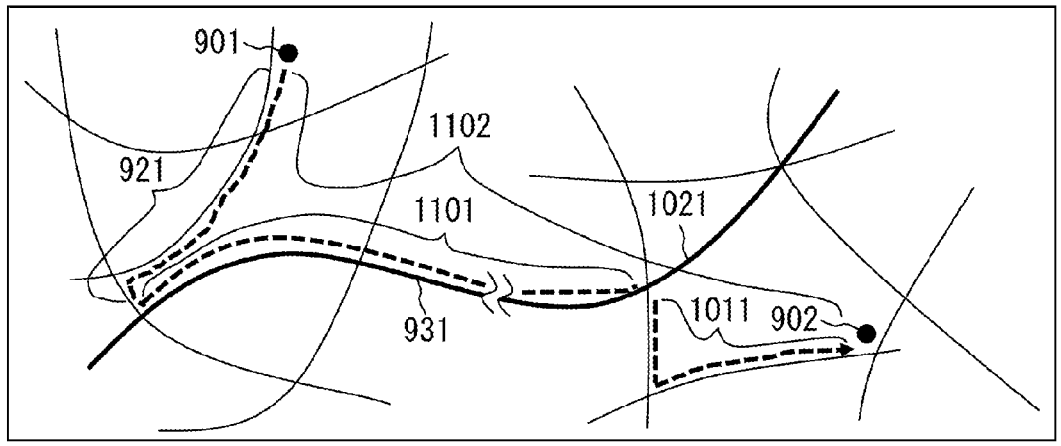
FIG. 11 is a diagram illustrating a path search at the highest level in a close-range search.

In the highest level path searching process, as illustrated in FIG. 11, a path 1102 indicated by a dotted line in FIG. 11 is obtained as a path from the departure point 901 to the destination point 902 passing through the partial path 921, the roads 931 and 1121 (1101) at the second level, and the partial path 1011.

In the medium-range search, the level of the roads 911 to 914 of FIG. 9 and the roads 1001 to 1005 of FIG. 10 is the second level or the first level.

In the long-range search, as illustrated in FIG. 12 for example, a path is searched for from the roads 1211 to 1215 at the first to third levels indicated by a thin line in FIG. 12 in the first partial path searching process. Then, a partial path 1221 indicated by a dotted line in FIG. 12 is obtained as a partial path that establishes a connection between the departure point 1201 and an exit and entrance 1241 at the expressway 1231 at the fourth level indicated by a bold line in FIG. 12. Moreover, as illustrated in FIG. 13, a path is searched for from the roads 1301 to 1304 at first to third levels indicated by a thin line in FIG. 13 in the second partial path searching process. Then, a partial path 1311 indicated by a dotted line in FIG. 13 is obtained as a partial path that establishes a connection between the destination point 1202 and an exit and entrance 1331 at the expressway 1321 at the fourth level indicated by a bold line in FIG. 13.

Next, in the highest level path searching process, as illustrated in FIG. 14, a path 1402 indicated by a dotted line in FIG. 14 is obtained as a path from the departure point 1201 to the destination point 1202 passing through the partial path 1221, the expressways 1231 and 1321 (1401), and the partial path 1311.

In the switching search process of FIGS. 6 through 8, the highest level and the one or more next highest levels of roads may be used instead of roads at the highest level. In such cases, a path is searched for from two or more levels of roads in the highest level path searching process of FIG. 8.

In the switching search process of FIGS. 6 through 8, m partial paths that establish connections between the destination point and a road at the highest level are obtained after n partial paths that establish connections between the departure point and a road at the highest level are obtained. However, a different partial path searching method may be used. For example, a partial path may be searched for in an alternate manner between the departure point side and the destination point side. In this method, a partial path that establishes a connection between the departure point and a road at the next higher level is searched for and then a partial path that establishes a connection between the destination point and a road at the next higher level is searched for, and this is followed by returning to a partial path search on the departure point side again, and a similar process is repeated. Alternatively, n partial paths that establish connections between the departure point and a road at the highest level may be obtained after m partial paths that establish connections between the destination point and a road at the highest level are obtained.

Figure 15:
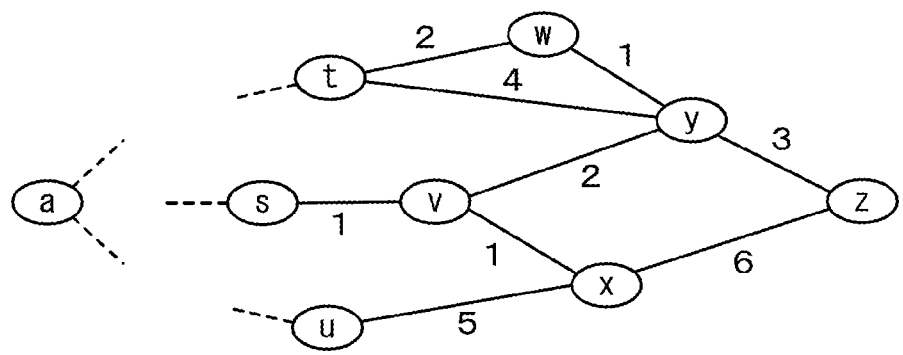
FIG. 15 is a diagram of a road network.

Note that a path search in which the destination point and departure point are handled as a beginning node and end node is performed in the second partial path searching process, which is different from the first partial path searching process. For example, supposing that the departure point and destination point are handled as node a and node z in the road network as illustrated in FIG. 15, a path is searched for from the node z to the node a, and partial paths that establish connections with a node s, t, u, or w on a road at the highest level via a node x, y, or v are searched for. Then, m partial paths are obtained from partial paths that establish connections with a node on a road at the highest level in ascending order of the cost value.

The values of the road link cost between nodes in FIG. 15 are as follows.

Road link between node t and node w: 2
Road link between node w and node y: 1
Road link between node t and node y: 4
Road link between node s and node v: 1
Road link between node v and node y: 2
Road link between node v and node x: 1
Road link between node u and node x: 5
Road link between node y and node z: 3
Road link between node x and node z: 6

For example, when Dijkstra's algorithm is adopted with m=3, three candidate paths as depicted in FIG. 16 are obtained as partial paths. A candidate path "z-y-w" is a partial path that establishes a connection between the node z and the node w via the node y, and its cost value is "3+1=4". A candidate path "z-y-v-s" is a partial path that establishes a connection between the node z and the node s via the nodes y and v, and its cost value is "3+2+1=6". A candidate path "z-y-t" is a partial path that establishes a connection between the node z and the node t via the node y, and its cost value is "3+4=7".

In such cases, when a path that connects to the nodes w, s, and t at which any of the candidate paths of FIG. 16 connects to a road at the highest level is found in the highest level path searching process, that node is added to the open list.

After that, the search in the section between the nodes w, s, and t and z proceeds on the road network composed of the nodes and links included in the candidate paths listed in FIG. 16, i.e., the road network composed of the nodes z, y, w, v, s, and t and the links z-y, y-w, y-v, v-s, and y-t. Note that the search is performed for the entire network in which the above section is connected to a section of roads at the highest level. Even if any one of w, s, and t is reached by any search on roads at the highest level, the search on roads at the highest level is not terminated.

Also in the first partial path searching process, a path search in which the departure point and destination point are handled as a beginning node and end node is performed in a similar manner, and n partial paths are obtained from partial paths that establish connections with a node on a road at the highest level in ascending order of the cost value. The obtained partial paths are used as candidate paths in the highest level path searching process.

Next, the process of changing the level to which a certain road belongs by changing the road type of the certain road will be explained with reference to FIGS. 17 through 21.

The inventors have discovered the idea of changing the assigned level of a different type of road network that connects specific types of road networks. In the path search that is performed for the roads at a higher level, roads whose level is lower than the present level are not searched for, and a path that establishes a node on the departure point side and a node on the destination point side is not always found. Even if a path is found, such a path may be an unrealistic path that is a far longer way. Hence, when two or more roads at a higher level connect with each other via a road at a lower level, the road at a lower level may be assumed to be a road at a higher level on a temporary or permanent basis. By adding such a process, it becomes possible to find a realistic path that passes through the road at a lower level.

Figure 17:
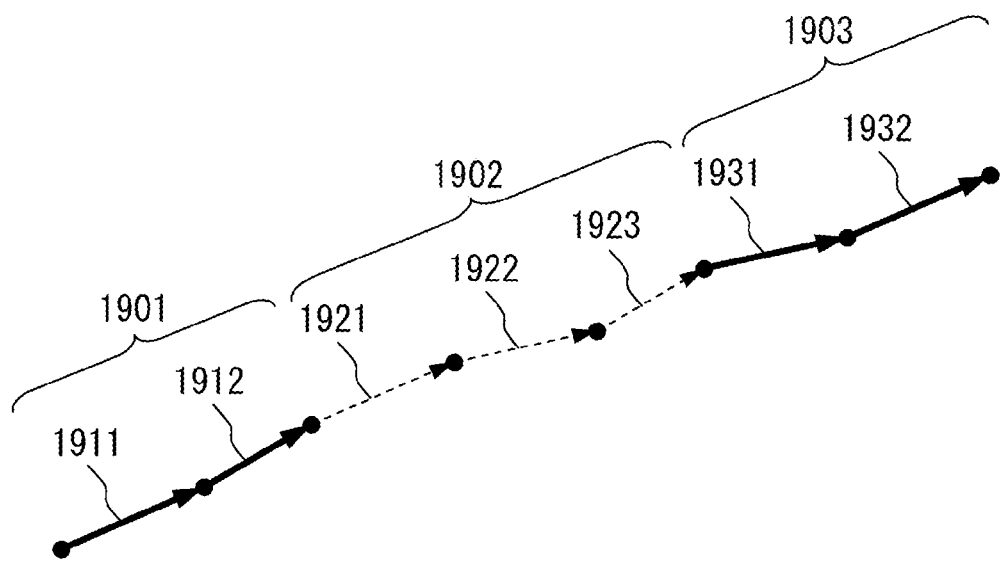
FIG. 17 is a diagram of a road at a lower level between two expressways.
Figure 18:
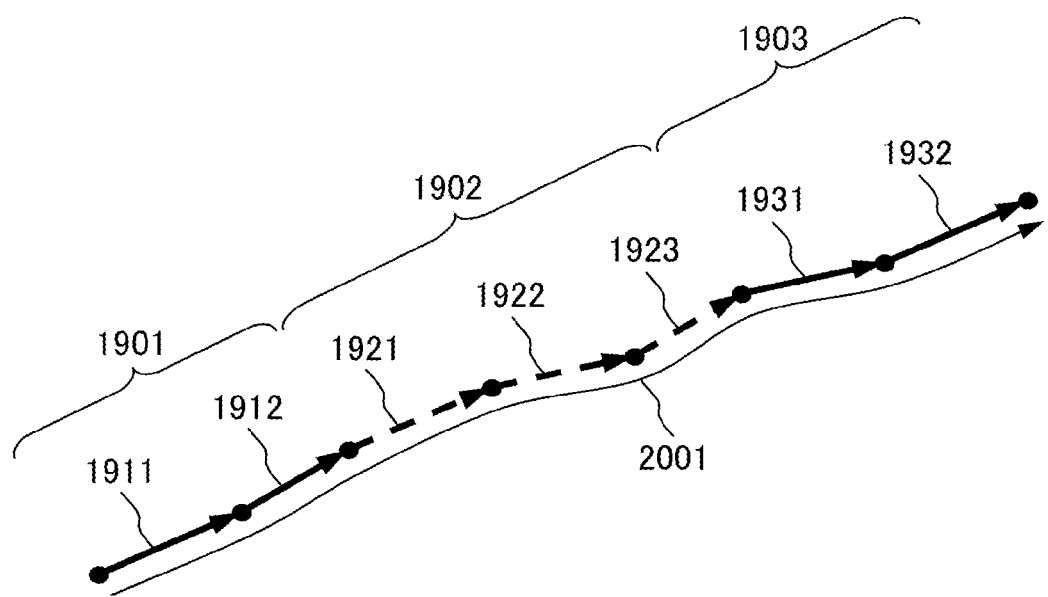
FIG. 18 is a diagram of a path in which two expressways and a road at a lower level are included.

For example, as illustrated in FIG. 17, the case in which a road at a lower level 1902 exists between an expressway 1901 and an expressway 1903 in the long-range search will be explained. The expressway 1901 includes road links 1911 and 1912, and the road 1902 includes road links 1921 to 1923. The expressway 1903 includes road links 1931 and 1932. In this case, a path 2001 via the road 1902 may be found by performing a path search in which the road links 1921 to 1923 are assumed to be links of an expressway, as illustrated in FIG. 18.

If the cost is smaller when the road 1902 is passed through than when another expressway that connects the expressway 1901 to the expressway 1903 is passed through, it is likely that the path 2001 is the path with the lowest cost.

For example, when a path from Niigata to Shizuoka is searched for, a path through which the Kan-etsu Expressway and the Tomei Expressway are passed is considered to be a path with the lowest cost. In this case, the Kan-etsu Expressway is not directly connected to the Tomei Expressway, and thus if only expressways are searched in the highest level path search, a path may not be found or an unrealistic path that is a far longer way may be found. However, if the Ring Road No. 8 as a principal local road that connects the Kan-etsu Expressway to the Tomei Expressway is assumed to be an expressway, a realistic path may be found that passes through the Kan-etsu Expressway, the Ring Road No. 8, and the Tomei Expressway.

Figure 19:
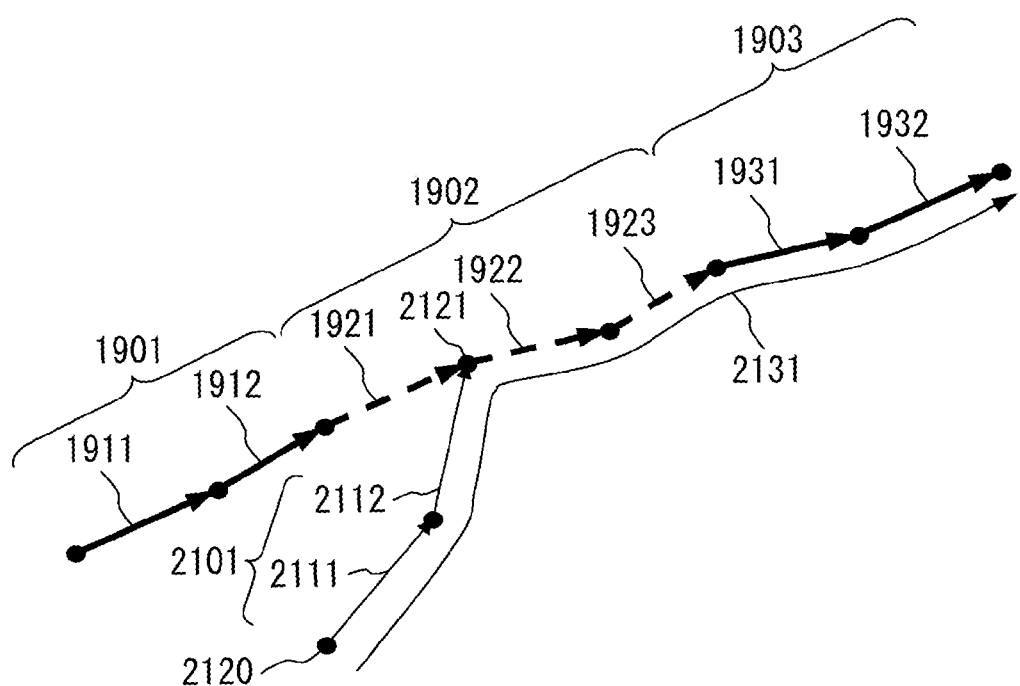
FIG. 19 is a diagram of a road that is connected to a road at a lower level between two expressways.

Next, as illustrated in FIG. 19, the case will be explained in which another road 2101 that is connected to the road 1902 exists and the departure point 2120 exists on the road 2101. The road 2101 includes road links 2111 and 2112. Also in this case, a path 2131 that includes a partial path that establishes a connection between the departure point 2120 and a node 2121 on the road 1902 may be found by performing a path search in which the road links 1921 to 1923 are assumed to be links of an expressway.

Note that the departure point or destination point does not necessarily exist on a link or node. In such cases, an intersection point on a closest link with a perpendicular line that is drawn from the departure point or destination point to the closest link is assumed to be the node corresponding to a departure point or the node corresponding to a destination point, and a search process where the above node is handled in an equivalent manner to the other nodes may be performed. The nodes corresponding to a departure point or a destination point may be set using a different method.

Due to the creation of the nodes corresponding to a departure point or a destination point, an originally single link may be divided into two or more links. In such cases, the road type that is associated with the original link may be applied to the group of the divided links.

Figure 20:
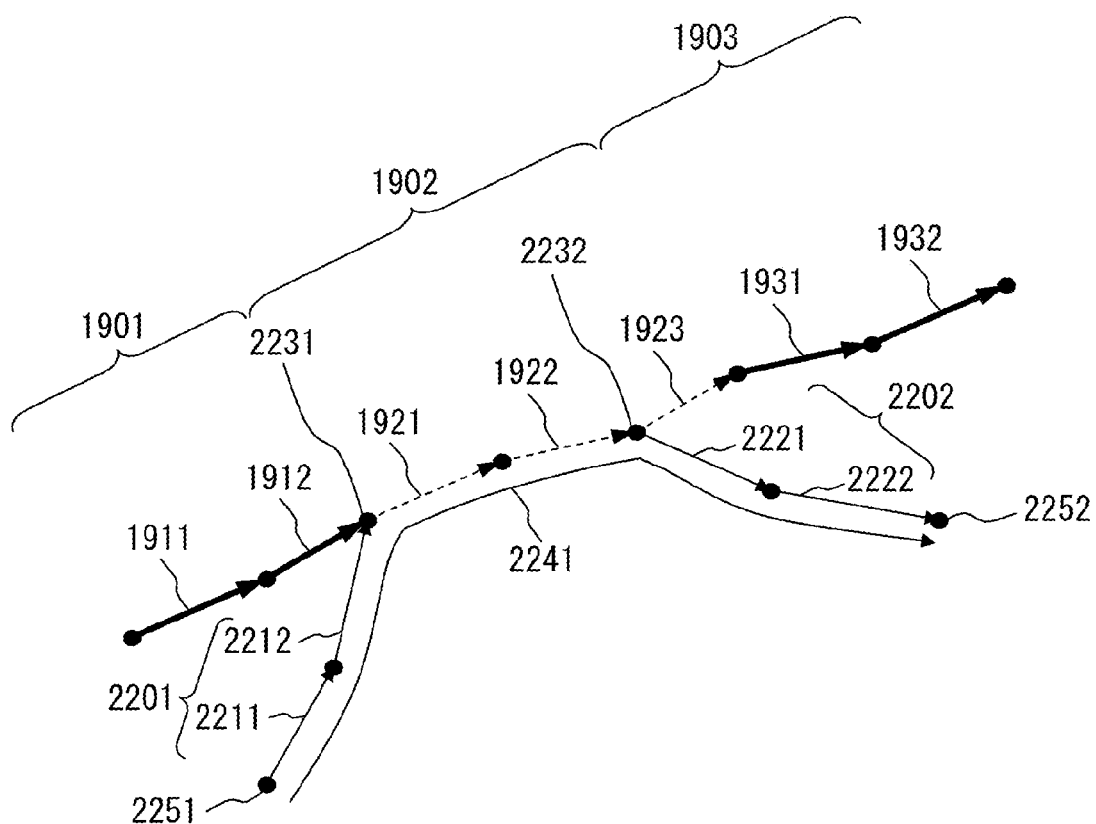
FIG. 20 is a diagram of two roads that are connected to a road at a lower level between two expressways.

On the other hand, in search methods other than the long-range search, it is preferred to not only obtain a path that does not include any expressways at all, but it is also preferred to obtain a path that includes an expressway but does not include an expressway around the road 1902 as a result of the search. For this reason, it is preferred that the road 1902 be handled as a road at the original low level. By way of example, as illustrated in FIG. 20, the case will be explained in which other roads 2201 and 2202 that are connected to the road 1902 exist, the departure point 2251 exists on the road 2201, and the destination point 2252 exists on the road 2202. The road 2201 includes road links 2211 and 2212, and the road 2202 includes road links 2221 and 2222.

In this case, a path 2241 that establishes a connection between the departure point 2251 and the destination point 2252 via nodes 2231 and 2232 on the road 1902 may be found by handling the road links 1921 to 1923 as road links at the original level rather than handling the road links 1921 to 1923 as links of an expressway.

FIG. 21 is a flowchart of an example of the type changing process in which a road type is changed. The type changing process may be performed, for example, at the first step of the processes in each of FIGS. 6 through 8. The search unit 202 firstly checks whether or not the search method determined in the process of determining a level is the long-range search (step 2301). When the search method is the long-range search (step 2301, "Yes"), next, the search unit 202 checks whether or not the path search is the highest level path searching process (step 2302).

When the path search is the highest level path searching process (herein, it is assumed that the highest level includes only expressways) (step 2302, "Yes"), the road type of a road at a lower level which exists between two expressways and connects these expressways is changed to an expressway. In other words, it is assumed that the road type is changed to an expressway and the subsequent search processes are performed (step 2304).

When the path search is not the highest level path searching process (step 2302, "No"), next, the search unit 202 checks whether or not the road at a lower level which exists between two expressways and connects these expressways should be assumed to be an expressway in the path searching (step 2303). For example, when the road at a lower level is entering one of the expressways, the road at a lower level is assumed to be an expressway in the path searching. On the other hand, when the road at a lower level is not entering any of the expressways and the path search is aimed at the entrance of another expressway, the road at a lower level is not assumed to be an expressway in the path searching.

When the road at a lower level is assumed to be an expressway (step 2303, "Yes"), the road type of that road is changed to an expressway (step 2304).

On the other hand, when the search method is not the long-range search (step 2301, "No") or when the road at a lower level that connects two expressways is not assumed to be an expressway and then a path search is performed (step 2303, "No"), the road type is not changed.

Also when the roads at a higher level are national roads, principal local roads, or the like other than expressways, as long as a road at a lower level exists between these roads, the road at a lower level may be assumed to be a road at a higher level. Accordingly, the possibility in which a realistic path is found becomes higher in a similar manner to the cases of expressways.

In each search method, it is also possible for a user to decide whether or not to use expressways. In this case, the terminal 101 transmits to a path search system the usability information that indicates use or non-use of expressways in the respective very-close-range search, close-range search, medium-range search, and long-range search. Then, the path search devices 105-1 to 105-4 store the usability information in the operational parameter storage unit 204. Alternatively, the usability information is directly received without storing it in the operational parameter storage unit 204, and the search unit 202 performs a path search in which expressways are excluded in the corresponding search method when the usability information indicates non-use.

When the non-use of expressways is designated in the long-range search, the search method may be changed to the medium-range search.

Note that the flowcharts in FIG. 5, FIGS. 6 through 8, and FIG. 21 are illustrated merely as an example, and some of the processes may be omitted or modified according to the configuration or condition of a path search system. Another method other than Dijkstra's algorithm or an A* algorithm may be adopted as a path searching algorithm. For example, algorithms such as the branch and bound, hill-climbing, and best-first search may be used.

Alternatively, roads may be classified according to the attributes such as the length or width of the road links, and the upper-limit traveling speed rather than classifying the roads according to the type of road. When the roads are classified according to the length of the road links, a longer road is classified as a higher level. When the roads are classified according to the width of the road links, a wider road is classified as a higher level. When the roads are classified according to the upper-limit traveling speed of the roads, a road whose upper-limit traveling speed is higher is classified as a higher level. In all cases, as the level of a road gets higher, a grouping is adopted in which a motor vehicle can travel more easily.

Figure 22:
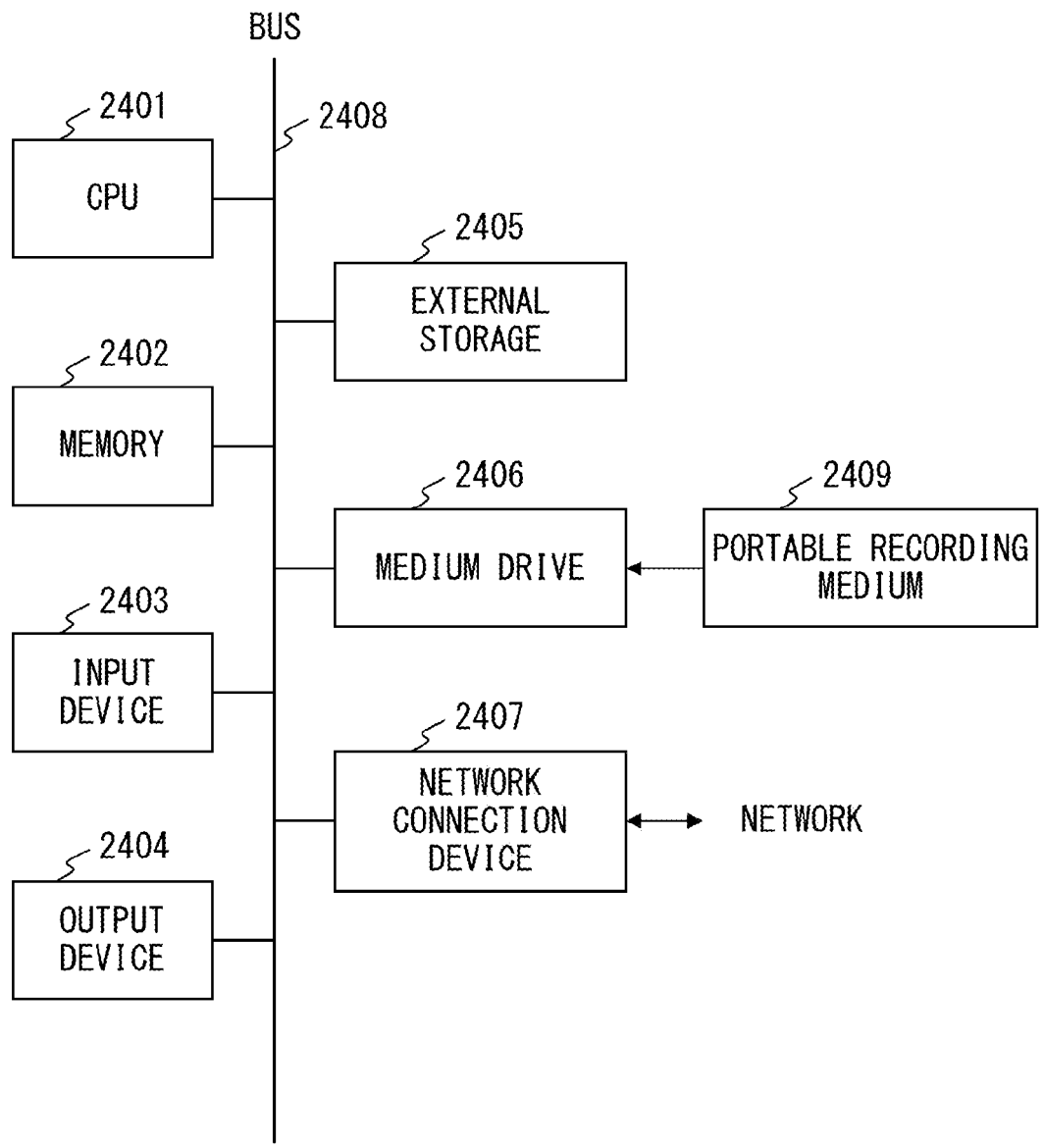
FIG. 22 is a block diagram of an information processing apparatus.

The terminal 101, the interface 103, the load balancer 104, the path search devices 105-1 to 105-4, the map information database 106, and the traffic information database 107 of FIG. 1 may be realized, for example, by using an information processing apparatus (computer) as depicted in FIG. 22.

The information processing apparatus of FIG. 22 is provided with a central processing unit (CPU) 2401, a memory 2402, an input device 2403, an output device 2404, an external storage 2405, a medium drive 2406, and a network connection device 2407. These elements are connected with each other through a bus 2408.

The memory 2402 is, for example, a semiconductor memory such as a read-only memory (ROM), a random access memory (RAM), or a flash memory, and the memory 2402 stores the program and data that are used in the processing. For example, the CPU 2401 (processor) may use the memory 2402 to execute a program, thereby performing the processes of the terminal 101, the interface 103, the load balancer 104, and the path search devices 105-1 to 105-4.

When the information processing apparatuses are used as the path search devices 105-1 to 105-4, the memory 2402 may be used as the operational parameter storage unit 204 of FIG. 2, and may also store the map information, the traffic information, and the open list.

The input device 2403 is, for example, a keyboard, a pointing device, or the like, and is used by a user or operator for giving instructions or inputting information. The output device 2404 is, for example, a display device, a printer, a speaker, or the like, and is used for making inquiries to a user or operator or outputting a processing result. The processing result at the terminal 101 includes a screen on which a path indicated by the path information is displayed.

The external storage 2405 may be, for example, a magnetic disk device, an optical disk device, a magneto-optic disk device, or a tape device. The external storage 2405 may be a hard disk drive. The information processing apparatus may store programs and data in the external storage 2405, and may use the stored programs and data by loading them into the memory 2402.

When the information processing apparatus is used as the map information database 106 or the traffic information database 107, the external storage 2405 stores the map information or traffic information.

The medium drive 2406 drives a portable recording medium 2409 to access the recorded contents. The portable recording medium 2409 may be a memory device, a flexible disk, an optical disk, a magneto-optic disk, or the like. The portable recording medium 2409 may be a compact disc read-only memory (CD-ROM), a digital versatile disc (DVD), a universal serial bus (USB) memory, or the like. A user or operator may store programs and data in the portable recording medium 2409, and may use the stored programs and data by loading them into the memory 2402.

As described above, a computer-readable recording medium in which a program and data used for various processes are stored may include a physical (non-transitory) recording medium such as the memory 2402, the external storage 2405, and the portable recording medium 2409.

The network connection device 2407 is a communication interface that is connected to a communication network such as the Local Area Network (LAN), the Internet, or the like, and that performs data conversion involved in the communication. The information processing apparatus may receive a program and data from an external device through the network connection device 2407, and may use the received program or data by loading it into the memory 2402.

It is not necessary for the information processing apparatus to include all the elements of FIG. 22, but some of the elements may be omitted according to their use or condition.

For example, when the information processing apparatus is used as the interface 103, the load balancer 104, the path search devices 105-1 to 105-4, the map information database 106, or the traffic information database 107, the input device 2403 and the output device 2404 may be omitted.

The interface 103, the load balancer 104, the path search devices 105-1 to 105-4, the map information database 106, or the traffic information database 107 of FIG. 1 may be individually implemented on information processing apparatuses that are connected so as to enable communication with each other, or may be implemented on a single information processing apparatus. An operator of the system may decide the number of information processing apparatuses with which the processing units in FIG. 1 other than the terminal 101 are implemented.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A path searching method performed by a computer, the method comprising:
    determining a classification pattern from a plurality of classification patterns by using a distance between a departure point and a destination point, each of the plurality of classification patterns comprising a plurality of road types classified into one of a plurality of levels and representing a correspondence between the plurality of levels and the plurality of road types, each of the plurality of classification patterns corresponding to one of a plurality of distance ranges, wherein the determining the classification pattern includes determining that a same road type belongs to a different level among the plurality of levels depending on which of the plurality of distance ranges the distance belongs to;
    performing, by using a processor, a first path search from the departure point to the destination point and a second path search from the destination point to the departure point while changing a search target from a road type at a lower level to a road type at a higher level according to the determined classification pattern;
    performing, by using the processor, a third path search from the departure point to the destination point for a road network including a first network, a second network and a third network, wherein the first network includes a group of road links obtained by the first path search, the second network includes a group of road links obtained by the second path search and the third network includes a group of road links of a road type at a highest level in the determined classification pattern; and
    generating path information according to a result of the third path search.

2. The path searching method according to claim 1, further comprising
    when the distance belongs to a specific distance range among the plurality of distance ranges and a road associated with a level other than a specific level among the plurality of levels exists between two roads that are associated with the specific level, changing the level of the road associated with the level other than the specific level to the specific level.

3. A path search device comprising
    a processor configured to execute a process including:
    determining a classification pattern from a plurality of classification patterns by using a distance between a departure point and a destination point, each of the plurality of classification patterns comprising a plurality of road types classified into one of a plurality of levels and representing a correspondence between the plurality of levels and the plurality of road types, each of the plurality of classification patterns corresponding to one of a plurality of distance ranges, wherein the determining the classification pattern includes determining that a same road type belongs to a different level among the plurality of levels depending on which of the plurality of distance ranges the distance belongs to;
    performing a first path search from the departure point to the destination point and a second path search from the destination point to the departure point while changing a search target from a road type at a lower level to a road type at a higher level according to the determined classification pattern;
    performing a third path search from the departure point to the destination point for a road network including a first network, a second network and a third network, wherein the first network includes a group of road links obtained by the first path search, the second network includes a group of road links obtained by the second path search and the third network includes a group of road links of a road type at a highest level in the determined classification pattern; and
    generating path information according to a result of the third path search.

4. A computer-readable recording medium having stored therein a program for causing a computer to execute a process comprising:
    determining a classification pattern from a plurality of classification patterns by using a distance between a departure point and a destination point, each of the plurality of classification patterns comprising a plurality of road types classified into one of a plurality of levels and representing a correspondence between the plurality of levels and the plurality of road types, each of the plurality of classification patterns corresponding to one of a plurality of distance ranges, wherein the determining the classification pattern includes determining that a same road type belongs to a different level among the plurality of levels depending on which of the plurality of distance ranges the distance belongs to;
    performing a first path search from the departure point to the destination point and a second path search from the destination point to the departure point while changing a search target from a road type at a lower level to a road type at a higher level according to the determined classification pattern;
    performing a third path search from the departure point to the destination point for a road network including a first network, a second network and a third network, wherein the first network includes a group of road links obtained by the first path search, the second network includes a group of road links obtained by the second path search and the third network includes a group of road links of a road type at a highest level in the determined classification pattern; and generating path information according to a result of the third path search.

5. A path searching method performed by a computer, the method comprising:
  determining a classification pattern from a plurality of classification patterns by using a distance between a departure point and a destination point, each of the plurality of classification patterns comprising a plurality of road types classified into one of a plurality of levels and representing a correspondence between the plurality of levels and the plurality of road types, each of the plurality of classification patterns corresponding to one of a plurality of distance ranges, wherein the determined classification pattern corresponds to a distance range including the distance between the departure point and the destination point;
  performing, by using a processor, a first path search from the departure point to the destination point and a second path search from the destination point to the departure point while changing a search target from a road type at a lower level to a road type at a higher level according to the determined classification pattern;
  performing, by using the processor, a third path search from the departure point to the destination point for a road network including a first network, a second network and a third network, wherein the first network includes a group of road links obtained by the first path search, the second network includes a group of road links obtained by the second path search and the third network includes a group of road links of a road type at a highest level in the determined classification pattern; and
  generating path information according to a result of the third path search.

6. The path searching method according to claim 5, further comprising
  when the distance belongs to a specific distance range among the plurality of distance ranges and a road associated with a level other than a specific level among the plurality of levels exists between two roads that are associated with the specific level, changing the level of the road associated with the level other than the specific level to the specific level.

7. A path search device comprising
  a processor configured to execute a process including:
  determining a classification pattern from a plurality of classification patterns by using a distance between a departure point and a destination point, each of the plurality of classification patterns comprising a plurality of road types classified into one of a plurality of levels and representing a correspondence between the plurality of levels and the plurality of road types, each of the plurality of classification patterns corresponding to one of a plurality of distance ranges, wherein the determined classification pattern corresponds to a distance range including the distance between the departure point and the destination point;
  performing a first path search from the departure point to the destination point and a second path search from the destination point to the departure point while changing a search target from a road type at a lower level to a road type at a higher level according to the determined classification pattern;
  performing a third path search from the departure point to the destination point for a road network including a first network, a second network and a third network, wherein the first network includes a group of road links obtained by the first path search, the second network includes a group of road links obtained by the second path search and the third network includes a group of road links of a road type at a highest level in the determined classification pattern; and
  generating path information according to a result of the third path search.

8. A computer-readable recording medium having stored therein a program for causing a computer to execute a process comprising:
  determining a classification pattern from a plurality of classification patterns by using a distance between a departure point and a destination point, each of the plurality of classification patterns comprising a plurality of road types classified into one of a plurality of levels and representing a correspondence between the plurality of levels and the plurality of road types, each of the plurality of classification patterns corresponding to one of a plurality of distance ranges, wherein the determined classification pattern corresponds to a distance range including the distance between the departure point and the destination point;
  performing a first path search from the departure point to the destination point and a second path search from the destination point to the departure point while changing a search target from a road type at a lower level to a road type at a higher level according to the determined classification pattern;
  performing a third path search from the departure point to the destination point for a road network including a first network, a second network and a third network, wherein the first network includes a group of road links obtained by the first path search, the second network includes a group of road links obtained by the second path search and the third network includes a group of road links of a road type at a highest level in the determined classification pattern; and
  generating path information according to a result of the third path search.

* * * * *